United States Patent
Nagarajan et al.

(10) Patent No.: US 9,796,024 B2
(45) Date of Patent: Oct. 24, 2017

(54) CUTTING INSERT WITH ENHANCED CHIP BREAKING PERFORMANCE

(71) Applicant: Kennametal India Ltd., Bangalore (IN)

(72) Inventors: Sathish Kumar Nagarajan, Tamilnadu (IN); Hariharan Suryanarayanan, Bangalore (IN); Igor Kaufmann, Nürnberg (DE)

(73) Assignee: KENNAMETAL INDIA LIMITED, Bangalore (IN)

( * ) Notice: Subject to any disclaimer, the term of this patent is extended or adjusted under 35 U.S.C. 154(b) by 202 days.

(21) Appl. No.: 14/671,323

(22) Filed: Mar. 27, 2015

(65) Prior Publication Data

US 2015/0283617 A1    Oct. 8, 2015

(30) Foreign Application Priority Data

Apr. 7, 2014  (IN) .......................... 1835/CHE/2014

(51) Int. Cl.
*B23B 27/22* (2006.01)
*B23B 27/14* (2006.01)

(52) U.S. Cl.
CPC .... *B23B 27/143* (2013.01); *B23B 2200/0447* (2013.01); *B23B 2200/081* (2013.01); *B23B 2200/32* (2013.01); *B23B 2200/3636* (2013.01); *B23C 2200/081* (2013.01); *Y10T 407/235* (2015.01)

(58) Field of Classification Search
CPC .......... B23B 27/143; B23B 2200/0447; B23B 2200/32; B23B 2200/321; B23B 2200/081; B23C 5/205; B23C 2200/0433; B23C 2200/32; B23C 2200/323; B23C 2200/081

See application file for complete search history.

(56) References Cited

U.S. PATENT DOCUMENTS

| | | | |
|---|---|---|---|
| 3,557,416 A * | 1/1971 | Jones .................... | B23B 27/143 407/114 |
| 3,815,191 A | 6/1974 | Holma | |
| 4,859,122 A | 8/1989 | Patterson et al. | |
| 5,116,167 A * | 5/1992 | Niebauer .............. | B23B 27/143 407/114 |

(Continued)

FOREIGN PATENT DOCUMENTS

JP       2006-110666 A     4/2006

*Primary Examiner* — Sunil K Singh
*Assistant Examiner* — Alan Snyder
(74) *Attorney, Agent, or Firm* — Ian K. Samways

(57) ABSTRACT

A cutting insert includes a body having an upper face, a lower face, a plurality of planar flank faces, bidirectional acute cutting corners and bidirectional obtuse cutting corners joining two adjacent flank faces. A land has a varying width. An annular island includes a plurality of bulged extensions, relatively longer and narrower chip breaking points proximate the acute cutting corners, and relatively shorter and wider chip breaking points proximate the obtuse cutting corners. A chip breaking ramp surface flanks each of the relatively longer and narrower chip breaking points and each of the relatively shorter and wider chip breaking points. The chip breaking ramp surfaces form a series of non-collinear lines that are at a non-zero angle with respect to the cutting edge.

16 Claims, 4 Drawing Sheets

(56) References Cited

U.S. PATENT DOCUMENTS

| | | | |
|---|---|---|---|
| 5,122,017 A * | 6/1992 | Niebauer | B23B 27/143 407/114 |
| 5,192,171 A | 3/1993 | Ther et al. | |
| 5,193,947 A | 3/1993 | Bernadic et al. | |
| 5,230,591 A * | 7/1993 | Katbi | B23B 27/143 407/114 |
| 5,249,894 A * | 10/1993 | Bernadic | B23B 27/143 407/114 |
| 5,324,144 A | 6/1994 | Katbi et al. | |
| 2002/0013661 A1 | 1/2002 | Van Riel et al. | |
| 2009/0226269 A1* | 9/2009 | Iyori | B23B 27/143 407/114 |

* cited by examiner

CUTTING INSERT WITH ENHANCED CHIP BREAKING PERFORMANCE

CLAIM TO PRIORITY

This application is a National entry application of Indian Application No. 1835/CHE/2014, filed on Apr. 7, 2014, the entire contents of which is incorporated herein by reference.

BACKGROUND OF THE INVENTION

Many specific forms of chip control cutting inserts are known in the art including cemented carbide cutting inserts having parallel faces, generally diamond configuration, bottom recesses below the cutting edges and chip breaking walls projecting up from the bottom recess.

It has long been a problem in the art to arrive at a disposable cutting insert that is capable of turning ductile materials and yet be affordable, and offer different feed rates and depths of cut.

SUMMARY OF THE INVENTION

The purpose of the present invention is to provide a cutting insert that offers a chip breaking capability range that is surprising, especially in view of the different feed rates at which the cutting insert is designed to operate.

In an aspect, a cutting insert comprises a body having an upper face, a lower face, and a plurality of planar flank faces perpendicular to and joining the upper and lower faces. A pair of bidirectional acute cutting corners and a pair of bidirectional obtuse cutting corners join two adjacent flank faces. A planar cutting edge is formed at an intersection between the upper face and at least one of the plurality of planar flank faces. A curved cutting edge is formed at an intersection between the upper face and at least one of the cutting corners. An annular island is formed around a central aperture. The island includes a plurality of bulged extensions, relatively longer and narrower chip breaking points proximate the acute cutting corners, and relatively shorter and wider chip breaking points proximate the obtuse cutting corners. A chip breaking ramp surface flanks each of the relatively longer and narrower chip breaking points and each of the relatively shorter and wider chip breaking points, wherein the chip breaking ramp surfaces form a series of non-collinear lines that are at a non-zero angle with respect to the substantially planar cutting edge.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

In the present description of non-limiting embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description and the attached claims are approximations that may vary depending upon the desired properties one seeks to obtain in the apparatus and methods according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Figure 1:
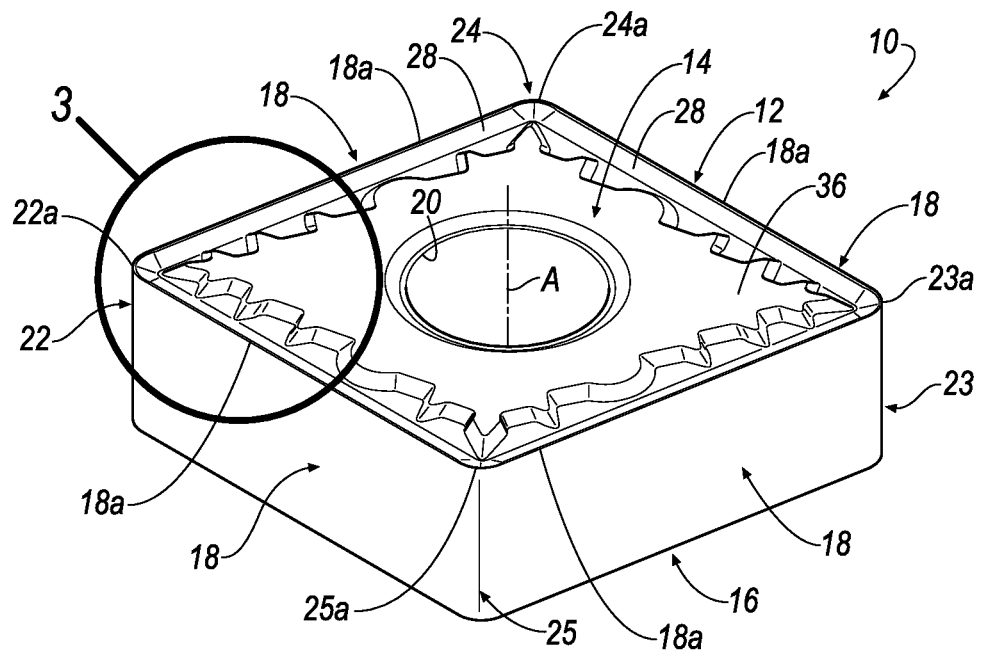
FIG. 1 is an isometric view of a cutting insert in accordance with an aspect of the invention.
Figure 2:
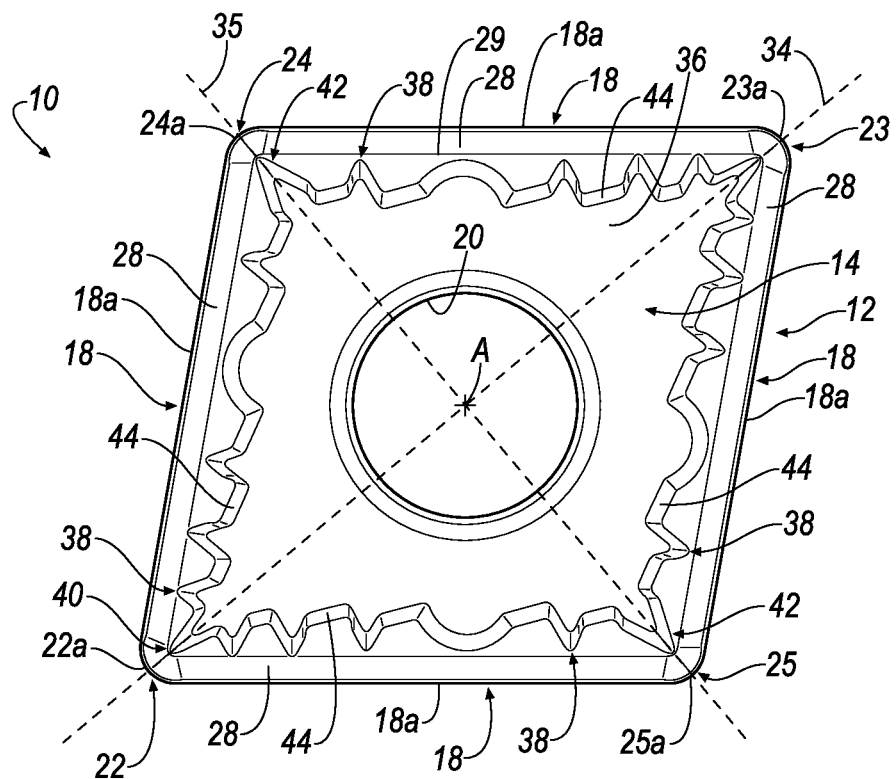
FIG. 2 is a top view of the cutting insert shown in FIG. 1 in accordance with an aspect of the invention.

Referring now to FIGS. 1-4, a cutting insert is shown generally at 10 according to an embodiment of the invention. In general, the cutting insert 10 has a polygonal body 12 with a central axis, A, (i.e., parallel to the z-axis) extending therethrough. In the illustrated embodiment, the cutting insert 10 is generally diamond in shape with respective 80o and 100o opposite acute and obtuse angles, as seen in FIG. 2. The body 12 has an upper face 14, a lower face 16, and a plurality of substantially planar flank faces 18 perpendicular to and joining the upper and lower faces 14, 16. A substantially planar cutting edge 18a is defined at the intersection between the upper and lower faces 14, 16 and each substantially planar flank face 18. The lower face 16 is substantially identical to the upper face 14, and therefore only the upper face 14 is described herein for brevity. However, it should be appreciated that any discussion herein regarding the upper face 14 applies to the lower face 16.

For the specific embodiment shown in the figures, a central aperture 20 is provided through the insert 10 for retention of the insert within a tool holder (not shown). In another embodiment, the cutting insert 10 does not include a hole therein for securing the cutting insert to a tool. Rather, the cutting insert 10 is retained in the tool by a clamping mechanism, which securely retains the cutting insert within the tool.

The cutting insert 10 includes bidirectional acute cutting corners 22, 23 and bidirectional obtuse cutting corners 24, 25 joining two adjacent flank faces 18. The bidirectional acute cutting corners 22, 23 have primary cutting edges 22a, 23a, respectively, for primary cutting and the bidirectional obtuse cutting corners 24, 25 have secondary cutting edges 24a, 25a, respectively, for creating chamfers.

The upper face 14 is provided with a land, shown generally at 26, extending to an entry line 27 from which an entry surface 28 descends at an angle 52 (FIGS. 5 and 6) in a range between about fifteen (15) degrees to about twenty-five (25) degrees to a planar bottom line 29 extending around a planar bottom surface 30. The land 26 has a substantially constant width 32 along the planar flank faces 18.

Figure 3:
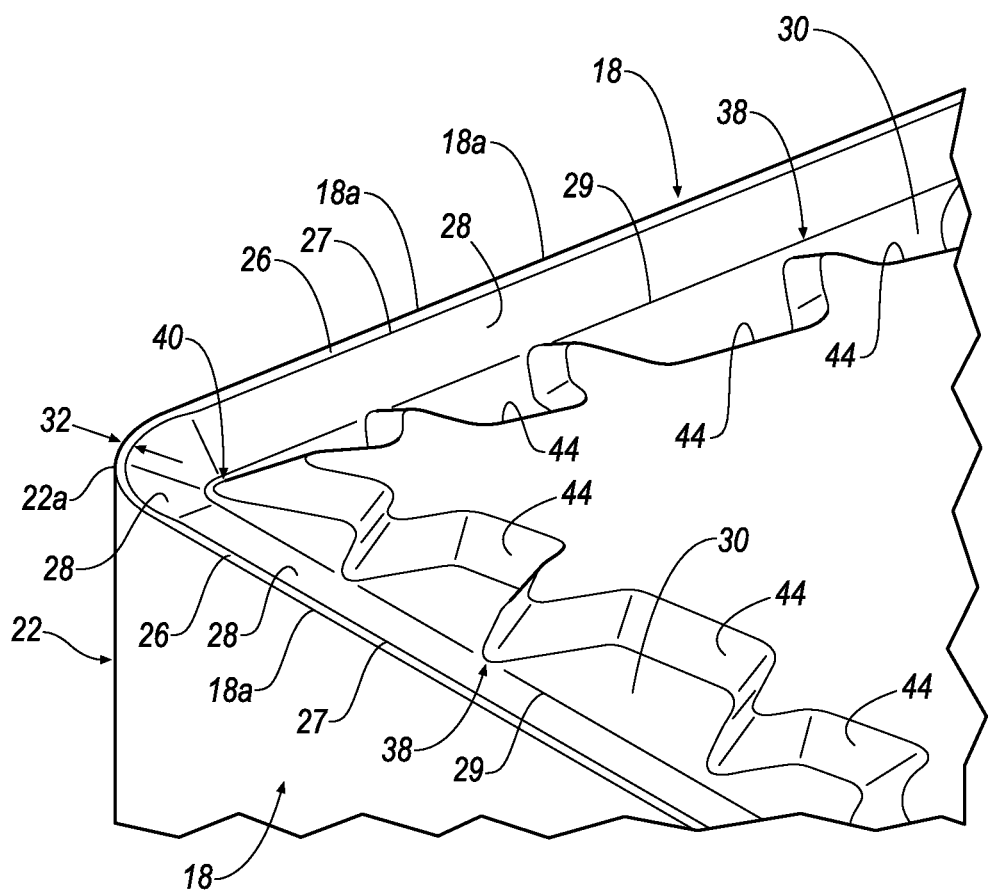
FIG. 3 is an enlarged, partial view of the curved cutting corner of the cutting insert shown in FIG. 1 in accordance with an aspect of the invention.

However, one aspect of the invention is that the land 26 has a varying width 32 along each of the cutting corners 22, 23, 24, 25, as shown in FIG. 3. Although FIG. 3 only shows the cutting corner 22, it should be understood that the discussion herein for cutting corner 22 also applies to the other cutting corners 23, 24, 25. The width 32 of the land 26 along the entire cutting corner 22 varies in such a way that the land 26 has a minimum width 32 proximate a bisector 34 of the bidirectional acute cutting corners 22, 23, and gradually increases moving away or distal from the bisector 34. Similarly, the land 26 has a minimum width 32 proximate a bisector 35 of the bidirectional obtuse cutting corners 24, 25, and gradually increases moving away or distal from the bisector 35. The varying width 32 of the land 26 along each of the cutting corners 22, 23, 24, 25 provides resistance to the depth of cut (DOC) notch. In addition, the varying width 32 enables the cutting insert 10 to perform metal cutting operations at higher depths of cut (DOC) and high feed rates, particularly in machining hard metal workpieces, such as titanium, Inconel, and the like. For example, the DOC can be in a range between about 0.04 inches to about 0.16 inches, and the feed rate can be in a range between about 0.008 IPR to about 0.016 IPR.

The top face 14 of the cutting insert 10 also includes an annular island 36 around the central aperture 20. The island 36 is higher in elevation than the land 26 so as to act as a seating surface for the cutting insert 10. The island 36 includes a plurality of bulged extensions 38 that serve to enhance the supporting geometry because of the proximity to the land 26 and aid in chip breaking, especially during face cutting and profiling cutting operations. Relatively longer and narrower chip breaking points 40 are provided at the acute cutting corners 22, 23, and relatively shorter and wider chip breaking points 42 are provided at the obtuse cutting corners 24, 25, as seen in FIG. 2.

Referring back to FIG. 4, a chip breaking ramp surface 44 flanks each of the relatively longer and narrower chip breaking points 40 and each of the relatively shorter and wider chip breaking points 42. In addition, the chip breaking ramp surface 44 connects each of the bulged extensions 38 to each other. The chip breaking ramp surfaces 44 form a series of non-collinear lines that are at a non-zero angle 46 with respect to the substantially planar cutting edge 18a (i.e., not parallel to the planar cutting edge 18a). In one embodiment, the angle 46 is in a range between about five (5) degrees and about twenty-five (25) degrees. The relatively small angle 46 allows for a larger feed rate and curls the chips in a direction away from the cutting corners 22, 23, 24, 25, which is particularly useful when machining difficult materials, such as titanium, Inconel, and the like.

Figure 4:
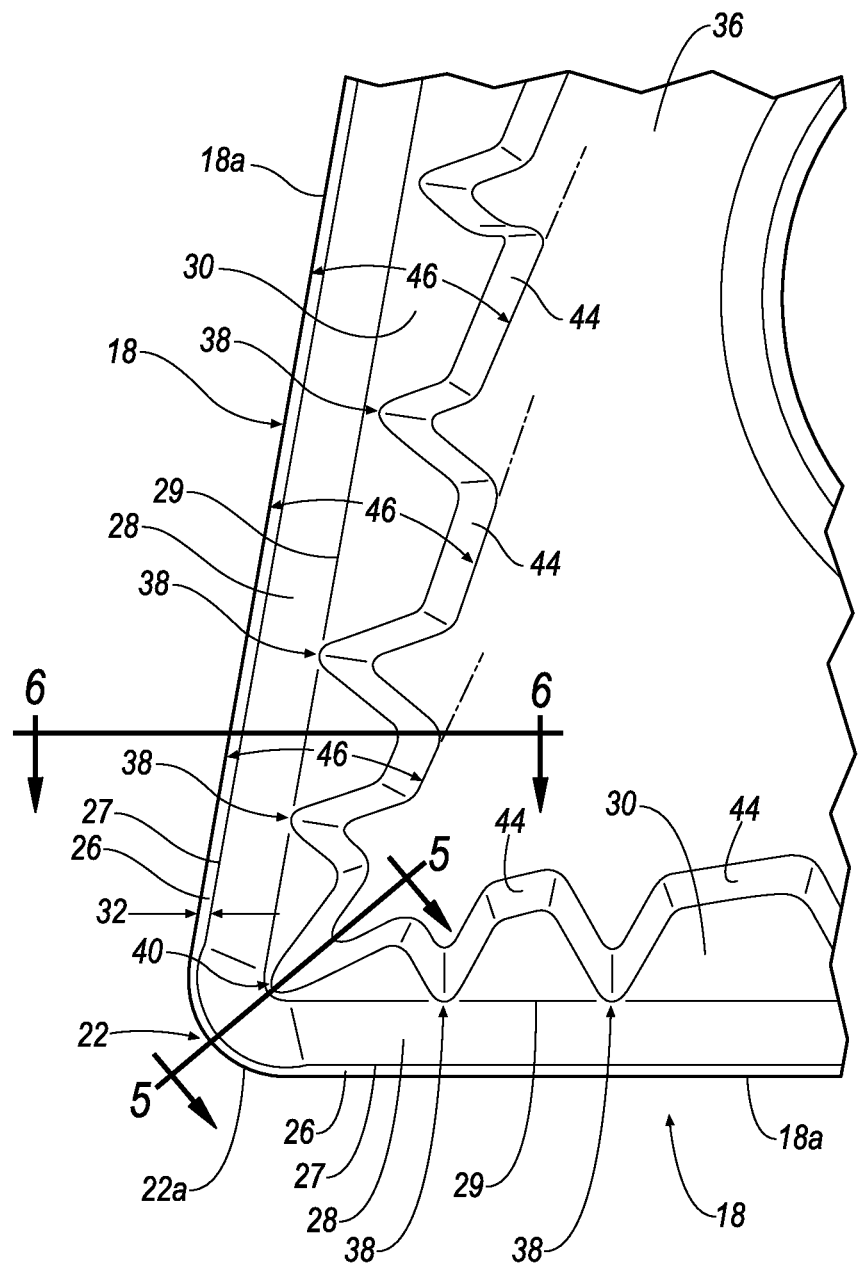
FIG. 4 an another enlarged, partial view of the curved cutting corner of the cutting insert in accordance with an aspect of the invention.
Figure 5:
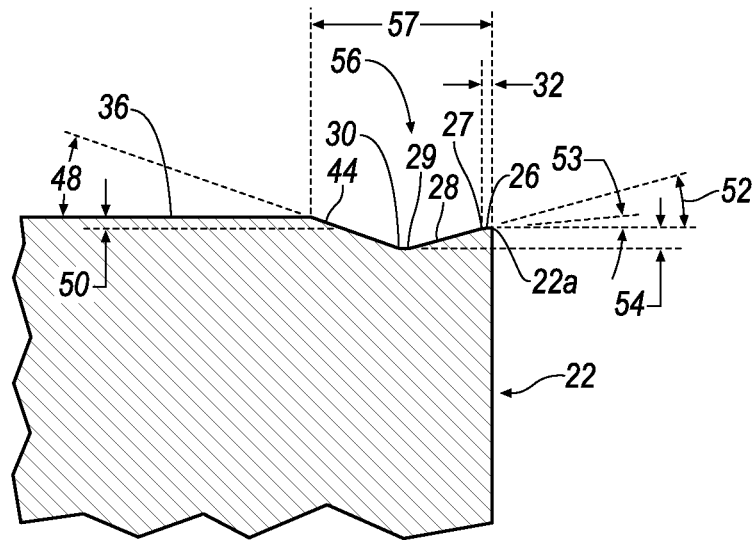
FIG. 5 is a cross-sectional view taken along line 5-5 of FIG. 4.
Figure 6:
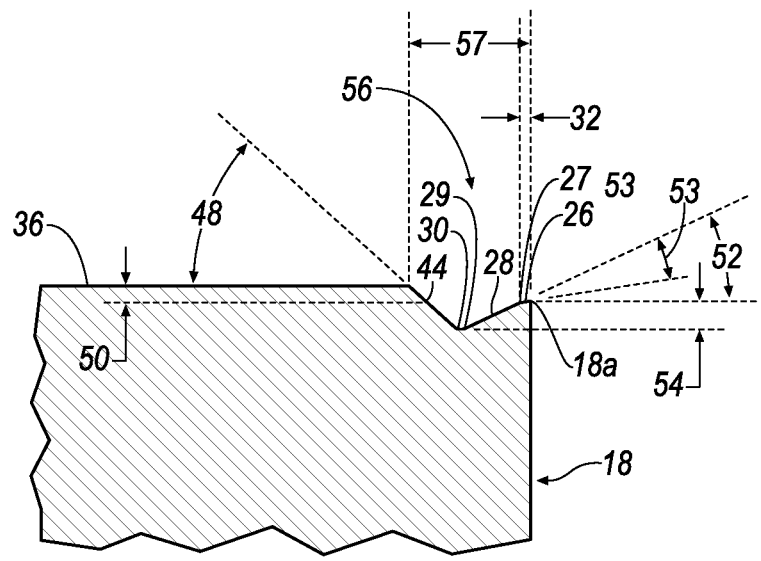
FIG. 6 is a cross-sectional view taken along line 6-6 of FIG. 4.

FIG. 5 is a cross-sectional view taken through the cutting corner 22 along line 5-5 of FIG. 4, and FIG. 6 is a cross-sectional view taken through the cutting edge 24 about 2 mm from the cutting corner 22 along line 6-6 of FIG. 4. As shown in FIGS. 5 and 6, each chip breaking ramp surface 44 has an incidence angle 48 of between about twenty-five (25) degrees and about forty-five (45) degrees with respect to a plane that is parallel to the island 36. For example, as shown in FIG. 5, the incidence angle 48 is about thirty (30) degrees with respect to the island 36, and the incidence angle 48 is about forty (40) degrees with respect to the island 36, as shown in FIG. 6. As shown in FIGS. 5 and 6, each land 26 is typically below the island 36 by a distance 50 in a range between about 0.10 mm to about 0.20 mm. The distance 50 between the land 26 and the island 36 provides greater interruption in the chip flow. The entry surface 28 is inclined at the angle 52 between about fifteen (15) degrees to about twenty-five (30) degrees leading to the planar bottom surface 30 to provide an open path for coolant and to reduce cutting forces. In addition, the land 26 is inclined at an angle 53, which is less than the angle 52 of the entry surface 28 to control the cutting forces, while increasing the edge strength of the cutting insert 10. The planar bottom surface 30 is lower than the cutting edge 22a by a distance 54. A groove 56 having a width 57 is formed by the chip breaking ramp surface 44, the planar bottom surface 30, the entry surface 28, and the land 26. The width 57 of the groove 56 provides an interruption to the normal chip flow and controls the point for the feed range of the cutting insert 10.

As described above, one aspect of the invention is that the land 26 has a varying width 32 along each of the cutting corners 22, 23, 24, 25. The varying width 32 of the land 26 along each of the cutting corners 22, 23, 24, 25 provides resistance to the depth of cut (DOC) notch. In addition, the varying width 32 enables the cutting insert 10 to perform metal cutting operations at higher depths of cut (DOC) and high feed rates, particularly in machining hard metal workpieces, such as titanium, Inconel, and the like.

Another aspect of the invention is that the chip breaking ramp surfaces 44 form a series of non-collinear lines with each other that are at a non-zero angle 46 with respect to the substantially planar cutting edge 18a. This relatively small angle 46 allows for a larger feed rate and curls the chips in a direction away from the cutting corners 22, 23, 24, 25, which is particularly useful when machining difficult materials, such as titanium, Inconel, and the like.

The patents and publications referred to herein are hereby incorporated by reference.

Having described presently preferred embodiments the invention may be otherwise embodied within the scope of the appended claims.

What is claimed is:

1. A cutting insert, comprising:
  a body having an upper face, a lower face, a plurality of planar flank faces perpendicular to and joining the upper and lower faces, a pair of bidirectional acute cutting corners and a pair of bidirectional obtuse cutting corners joining two adjacent flank faces;
  a substantially planar cutting edge at an intersection between the upper face and at least one of the plurality of planar flank faces;
  a curved cutting edge at an intersection between the upper face and at least one of the cutting corners;
  an annular island around a central aperture, the island including a plurality of bulged extensions, relatively longer and narrower chip breaking points proximate the acute cutting corners, and relatively shorter and wider chip breaking points proximate the obtuse cutting corners; and
  a chip breaking ramp surface flanking each of the relatively longer and narrower chip breaking points and each of the relatively shorter and wider chip breaking points,
  wherein one of the chip breaking ramp surfaces forms a series of two or more non-collinear lines that each define the same non-zero angle with respect to the substantially planar cutting edge.

2. The cutting insert of claim 1, further comprising a land proximate at least one of the cutting corners.

3. The cutting insert of claim 2, wherein the land has a varying width.

4. The cutting insert of claim 1, wherein the angle is in a range between 5 degrees and 25 degrees.

5. The cutting insert of claim 1, wherein each chip breaking ramp surface has an incidence angle of between 25 degrees and 45 degrees with respect to a plane that is parallel to the island.

6. The cutting insert of claim 1, wherein each of two or more of the chip breaking ramp surfaces forms a series of two or more non-collinear lines that each define the same non-zero angle with respect to the substantially planar cutting edge.

7. The cutting insert of claim 6, wherein the two or more of the chip breaking ramp surfaces comprise four chip breaking ramp surfaces.

8. The cutting insert of claim 7, wherein the upper face exhibit mirrors symmetry about a first bisector, defined through the bidirectional acute cutting corners, and about a second bisector, defined through the bidirectional obtuse cutting corners.

9. The cutting insert of claim 7, wherein each of the chip breaking ramp surfaces extends between one of the relatively longer and narrower chip breaking points and one of the relatively shorter and wider chip breaking points.

10. The cutting insert of claim 1, wherein each of the chip breaking ramp surfaces extends between one of the relatively longer and narrower chip breaking points and one of the relatively shorter and wider chip breaking points.

11. The cutting insert of claim 10, wherein, between a one of the relatively longer and narrower chip breaking points and one of the relatively shorter and wider chip breaking points:
   two or more of the bulged extensions are disposed; and
   a corresponding one of the chip breaking ramp surfaces connects the bulged extensions to one another.

12. The cutting insert of claim 3, wherein the land has a minimum width proximate a first bisector, defined through the bidirectional acute cutting corners.

13. The cutting insert of claim 12, wherein the width of the land increases moving away from the first bisector at each of the bidirectional acute cutting corners.

14. The cutting insert of claim 13, wherein:
   the land has a minimum width proximate a second bisector, defined through the bidirectional obtuse cutting corners; and
   the width of the land increases moving away from the second bisector at each of the bidirectional obtuse cutting corners.

15. The cutting insert of claim 3, wherein the land has a minimum width proximate a bisector, defined through the bidirectional obtuse cutting corners.

16. The cutting insert of claim 15, wherein the width of the land increases moving away from the bisector at each of the bidirectional obtuse cutting corners.

\* \* \* \* \*